United States Patent
Kondamudi (10) Patent No.: US 12,014,083 B2
(45) Date of Patent: Jun. 18, 2024

(54) METHOD AND SYSTEM FOR IMPLEMENTATION OF SCALABLE QUEUE WITH DELAY

(71) Applicant: WizRocket Inc., Mountain View, CA (US)

(72) Inventor: Suresh Kondamudi, Mumbai (IN)

(73) Assignee: WizRocket Inc., Mountain View, CA (US)

( * ) Notice: Subject to any disclaimer, the term of this patent is extended or adjusted under 35 U.S.C. 154(b) by 238 days.

(21) Appl. No.: 17/644,586

(22) Filed: Dec. 16, 2021

(65) Prior Publication Data

US 2023/0195380 A1    Jun. 22, 2023

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ...... G06F 3/0659; G06F 3/0604; G06F 3/067; G06F 3/061; G06F 3/0676
See application file for complete search history.

(56) References Cited

U.S. PATENT DOCUMENTS

| | | | | |
|---|---|---|---|---|
| 2001/0028524 A1* | 10/2001 | Hoskins | ................ | G06F 3/0611 360/55 |
| 2003/0212813 A1* | 11/2003 | Kashyap | ................ | H04L 67/62 709/237 |
| 2009/0187705 A1* | 7/2009 | Bernardi | ............... | G06F 3/0676 711/E12.001 |
| 2014/0325519 A1* | 10/2014 | Li | ........................... | H04L 67/01 718/103 |
| 2020/0319980 A1* | 10/2020 | Marathe | ................ | G06F 3/0652 |

* cited by examiner

*Primary Examiner* — Michelle T Bechtold
(74) *Attorney, Agent, or Firm* — Kolisch Hartwell, P.C.

(57) ABSTRACT

The present disclosure provides a system for performing a method for implementation of a scalable queue with a delay factor. The method includes a first step of creating a disk based queue. The method includes another step of mapping head of the disk based queue and tail of the disk based queue with a primary storage. The method includes yet another step of adding checksum in between data inside the disk based queue. The method includes yet another step of dividing the disk based queue in to a plurality of sub-queues with the delay factor. Furthermore, the checksum is added for identifying tampering in data, maintaining persistence and throughput in the disk based queue. Moreover, the delay factor is achieved by dividing the disk based queue in to the plurality of sub-queues based on a time period. The disk based queue is highly scalable using a network file system.

20 Claims, 4 Drawing Sheets

METHOD AND SYSTEM FOR IMPLEMENTATION OF SCALABLE QUEUE WITH DELAY

TECHNICAL FIELD

The present disclosure relates to the field of queue processing, and in particular, relates to a method and system for implementation of scalable queue with delay.

INTRODUCTION

Over the past few years, industrial and commercial processes have become increasingly automated, autonomous and distributed. It has become extremely complex to optimize delivery of services to users. Currently, many businesses utilize implementation of queues to automate delivery of services to users. In addition, businesses use queues to prioritize sending of data stored inside the queues. Queue is a collection of entities that are maintained in a sequence. In addition, entities inside the queue may be modified by addition of entities at one end of the sequence and removal of entities at other end of the sequence. Queue is a linear structure that follows first in first out order of execution. Enqueue operation is used to insert data at one end of the queue. Further, dequeue operation is used to remove data from another end of the queue.

SUMMARY

In a first example, a computer-implemented method is provided. The computer-implemented method performs implementation of a scalable queue with a delay factor. The method includes a first step of creating a disk based queue. The method includes another step of mapping head of the disk based queue and tail of the disk based queue with a primary storage. The method includes yet another step of adding checksum in between data inside the disk based queue. The method includes yet another step of dividing the disk based queue in to a plurality of sub-queues with the delay factor. In addition, the disk based queue performs writing of data from a secondary storage in to the primary storage. The disk based queue performs writing of data for performing faster computations. Further, mapping of the head of the disk based queue and the tail of the disk based queue facilitates the disk based queue for performing faster computations. Furthermore, the checksum is added for identifying tampering in data. The checksum is added for maintaining persistence and throughput in the disk based queue. Moreover, the delay factor is achieved by dividing the disk based queue in to the plurality of sub-queues based on a time period. The disk based queue is highly scalable using a network file system.

In an embodiment of the present disclosure, the computer-implemented method performs another step of sending alerts based on data stored in the disk based queue. The alerts are sent out based on implementation of each of the plurality of sub-queues according to the delay factor.

In an embodiment of the present disclosure, the computer-implemented method performs another step of enqueue operation. Enqueue operation facilitates loading data in to the disk based queue from the primary memory.

In an embodiment of the present disclosure, the computer-implemented method performs another step of dequeue operation. Dequeue operation facilitates loading data from the primary memory to the disk based queue.

In an embodiment of the present disclosure, tampering in data in the disk based queue is performed due to one or more factors. The one or more factors include power failure and hardware failure.

In an embodiment of the present disclosure, the disk based queue is divided in to the plurality of sub-queues based on the time period. The time period is either pre-determined or the time period is set by an administrator based on requirement.

In an embodiment of the present disclosure, each of the plurality of sub-queues is a first-in-first-out queue.

In a second example, a computer system is provided. The computer system includes one or more processors and a memory. The memory is coupled to the one or more processors. The instructions cause the one or more processors to perform a method for implementation of a scalable queue with a delay factor. The method includes a first step of creating a disk based queue. The method includes another step of mapping head of the disk based queue and tail of the disk based queue with a primary storage. The method includes yet another step of adding checksum in between data inside the disk based queue. The method includes yet another step of dividing the disk based queue in to a plurality of sub-queues with the delay factor. In addition, the disk based queue performs writing of data from a secondary storage in to the primary storage. The disk based queue performs writing of data for performing faster computations. Further, mapping of the head of the disk based queue and the tail of the disk based queue facilitates the disk based queue for performing faster computations. Furthermore, the checksum is added for identifying tampering in data. The checksum is added for maintaining persistence and throughput in the disk based queue. Moreover, the delay factor is achieved by dividing the disk based queue in to the plurality of sub-queues based on a time period. The disk based queue is highly scalable using a network file system.

In an embodiment of the present disclosure, the method performs another step of sending alerts based on data stored in the disk based queue. The alerts are sent out based on implementation of each of the plurality of sub-queues according to the delay factor.

In an embodiment of the present disclosure, the method performs another step of enqueue operation. Enqueue operation facilitates loading data in to the disk based queue from the primary memory.

In an embodiment of the present disclosure, the method performs another step of dequeue operation. Dequeue operation facilitates loading data from the primary memory to the disk based queue.

In an embodiment of the present disclosure, tampering in data in the disk based queue is performed due to one or more factors. The one or more factors includes power failure and hardware failure.

In an embodiment of the present disclosure, the disk based queue is divided in to the plurality of sub-queues based on the time period. The time period is either pre-determined or the time period is set by an administrator based on requirement.

In an embodiment of the present disclosure, each of the plurality of sub-queues is a first-in-first-out queue.

In an embodiment of the present disclosure, compression of the data is performed using one or more compression techniques. The one or more compression techniques include at least one of block compression, dictionary encoding and enumeration.

In an embodiment of the present disclosure, the query process isolation system enables isolation between the one or more query processes and the data space.

In an embodiment of the present disclosure, the one or more computing operations includes at least one of inputting, outputting, processing, storing, and controlling.

In a third example, a non-transitory computer-readable storage medium is provided. The non-transitory computer-readable storage medium encodes computer executable instructions that, when executed by at least one processor, performs a method. The method performs implementation of a scalable queue with a delay factor. The method includes a first step of creating a disk based queue. The method includes another step of mapping head of the disk based queue and tail of the disk based queue with a primary storage. The method includes yet another step of adding checksum in between data inside the disk based queue. The method includes yet another step of dividing the disk based queue in to a plurality of sub-queues with the delay factor. In addition, the disk based queue performs writing of data from a secondary storage in to the primary storage. The disk based queue performs writing of data for performing faster computations. Further, mapping of the head of the disk based queue and the tail of the disk based queue facilitates the disk based queue for performing faster computations. Furthermore, the checksum is added for identifying tampering in data. The checksum is added for maintaining persistence and throughput in the disk based queue. Moreover, the delay factor is achieved by dividing the disk based queue in to the plurality of sub-queues based on a time period. The disk based queue is highly scalable using a network file system.

In an embodiment of the present disclosure, the method performs another step of sending alerts based on data stored in the disk based queue. The alerts are sent out based on implementation of each of the plurality of sub-queues according to the delay factor.

In an embodiment of the present disclosure, the method performs another step of enqueue operation. Enqueue operation facilitates loading data in to the disk based queue from the primary memory.

In an embodiment of the present disclosure, the method performs another step of dequeue operation. Dequeue operation facilitates loading data from the primary memory to the disk based queue.

In an embodiment of the present disclosure, tampering in data in the disk based queue is performed due to one or more factors. The one or more factors include power failure and hardware failure.

In an embodiment of the present disclosure, the disk based queue is divided in to the plurality of sub-queues based on the time period. The time period is either pre-determined or the time period is set by an administrator based on requirement.

BRIEF DESCRIPTION OF THE DRAWINGS

Having thus described the invention in general terms, references will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
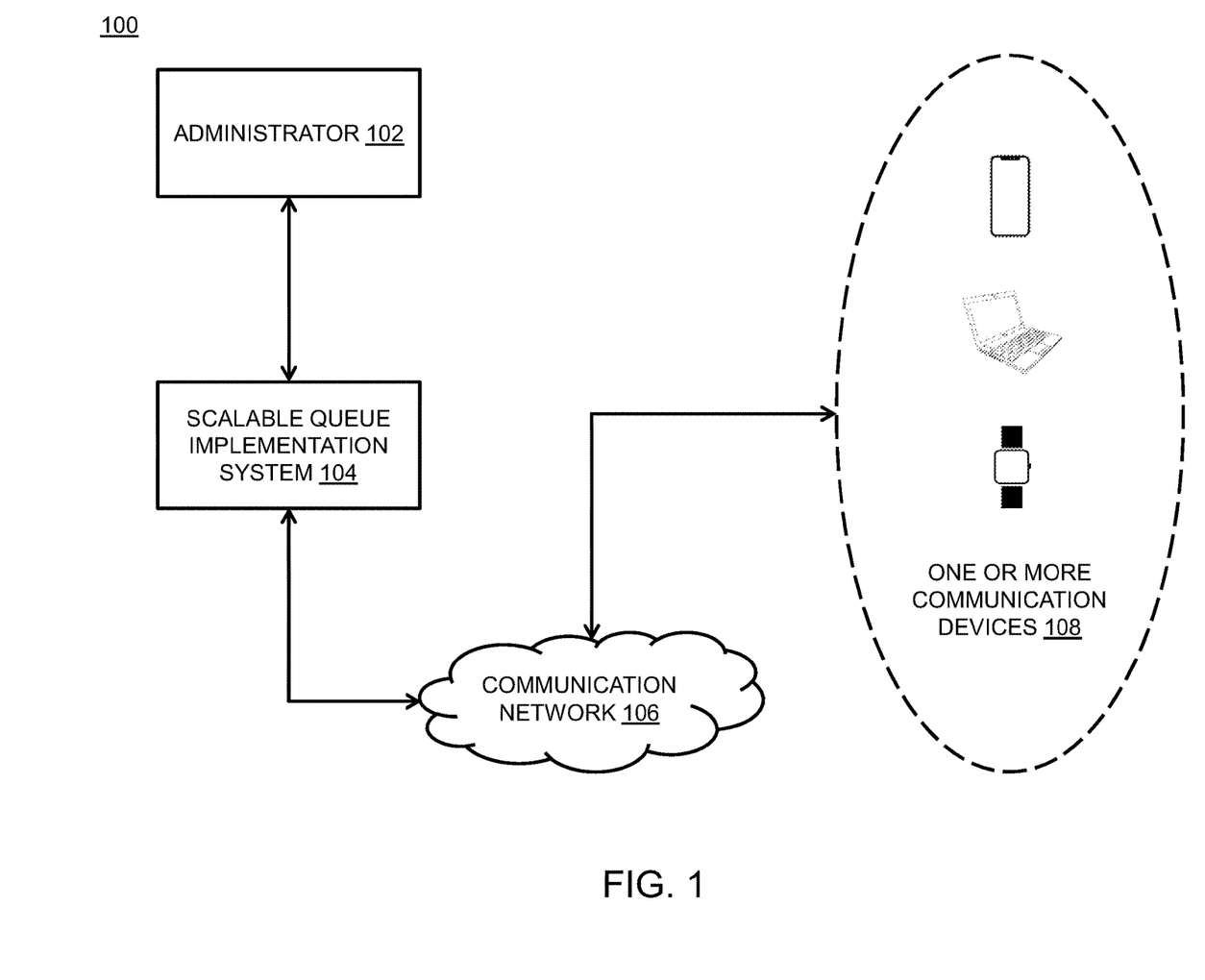
FIG. 1 illustrates an interactive computing environment of a system performing method for implementation of a scalable queue with a delay factor, in accordance with various embodiments of the present disclosure.

FIG. 1 illustrates an interactive computing environment 100 of a system performing a method for implementation of a scalable queue with a delay factor, in accordance with various embodiments of the present disclosure. The interactive computing environment 100 includes an administrator 102, and a scalable queue implementation system 104. In addition, the interactive computing environment 100 includes a communication network 106 and one or more communication devices 108. The scalable queue implementation system 104 performs the method for implementation of the scalable queue with the delay factor.

The queue is a collection of entities that are maintained in a sequence. In addition, the queue is modified by addition of entities at one end of sequence and removal of entities from other end of sequence. The queue is a linear data structure that follows a particular order in which operations are performed. The order is FIFO (first in first out).

The administrator 102 is any person, company or organization that is responsible to implement the scalable queue for one or more clients. In an embodiment of the present disclosure, the administrator 102 is responsible for operation and maintenance of the scalable queue implementation system 104. In another embodiment of the present disclosure, the administrator 102 is responsible for troubleshoot and repair of the scalable queue implementation system 104. In yet another embodiment of the present disclosure, the administrator 102 is responsible to handle the scalable queue implementation system 104.

The one or more clients include any persons, businesses or organizations that require the scalable queue implementation system 104. In an embodiment of the present disclosure, the one or more clients have requirement to utilize the scalable queue implementation system 104. In another embodiment of the present disclosure, the one or more clients include businesses that want to implement the scalable queue over a network. In yet another embodiment of the present disclosure, the one or more clients have requirement to implement the scalable queue with a delay factor.

The interactive computing environment 100 includes the one or more communication devices 108. In an embodiment of the present disclosure, the one or more communication devices 108 are associated with the one or more clients. In another embodiment of the present disclosure, the one or more communication devices 108 are associated with each of the one or more clients. Each of the one or more communication devices 108 is any computer system that mainly comprises memory, storage, processor, network connectivity and a display panel.

In an embodiment of the present disclosure, the one or more communication devices 108 are portable computing devices. In an example, the portable computing devices include laptop, smartphone, tablet, smart watch and the like. In an example, the smartphone is at least one of an Apple smartphone, an Android-based smartphone, a Windows-based smartphone and the like. In another embodiment of the present disclosure, the one or more communication devices 108 are fixed computing devices. In an example, fixed computing devices include but may not be limited to a desktop, a workstation PC, mainframe computer and the like.

In addition, the one or more communication devices 108 require an operating system to install and load an application in the one or more communication devices 108. The operating system is system software that manages hardware and software resources and provides common services for computer programs. In addition, operating system acts as an interface for the application installed inside the one or more communication devices 108 to interact with hardware components of the one or more communication devices 108.

In an embodiment of the present disclosure, operating system installed inside the one or more communication devices 108 is a mobile operating system. In another embodiment of the present disclosure, the one or more communication devices 108 run on any suitable operating system designed for the portable computer systems.

In an example, the mobile operating system includes but may not be limited to Windows operating system from Microsoft, Android operating system from Google, iOS operating system from Apple, Symbian based operating system from Nokia, Bada operating system from Samsung Electronics and BlackBerry operating system from BlackBerry. In an embodiment of the present disclosure, operating system is not limited to the above mentioned operating systems. In addition, the one or more communication devices 108 runs on any version of the above mentioned operating systems.

In another embodiment of the present disclosure, the one or more communication devices 108 runs on any suitable operating system designed for fixed computing devices. In an example, the operating system installed inside the one or more communication devices 108 is Windows from Microsoft. In another example, the operating system installed inside the one or more communication devices 108 is Mac from Apple. In yet another example, the operating system installed inside the one or more communication devices 108 is Linux based operating system. In yet another example, the operating system installed inside the one or more communication devices 108 may be UNIX, Kali Linux, and the like.

In an embodiment of the present disclosure, the one or more communication devices 108 runs on any version of Windows operating system. In another embodiment of the present disclosure, the one or more communication devices 108 runs on any version of Mac operating system. In another embodiment of the present disclosure, the one or more communication devices 108 runs on any version of Linux operating system. In yet another embodiment of the present disclosure, the one or more communication devices 108 runs on any version of the above mentioned operating systems.

In an embodiment of the present disclosure, each of the one or more communication devices 108 includes the display panel to interact with the application. Also, each of the one or more communication devices 108 includes the display panel to display results fetched from the application. In an embodiment of the present disclosure, each of the one or more communication devices 108 includes an advanced vision display panel. The advanced vision display panels include OLED, AMOLED, Super AMOLED, Retina display, Haptic touchscreen display and the like. In another embodiment of the present disclosure, each of the one or more communication devices 108 includes a basic display panel. The basic display panel includes but may not be limited to LCD, IPS-LCD, capacitive touchscreen LCD, resistive touchscreen LCD, TFT-LCD and the like.

In an embodiment of the present disclosure, the scalable queue implementation system 104 operates using an application. The application is installed in a computing device. The computing device is identical to each of the one or more communication devices 108. The application is any software code that is basically programmed to interact with hardware elements of the computing device. The hardware elements refer to a plurality of memory types, processor, and other internal components embedded or installed inside a computer system.

Further, the application is used to access, read, update and modify data stored in hardware elements of the computing device. In an embodiment of the present disclosure, the application is any software code that may interact with random access memory of the computing device. In another embodiment of the present disclosure, the application is any software code that may interact with hard disk drive or solid state drive of the computing device.

In an example, the application is a DBMS application. The term DBMS stands for database management system. The DBMS application is software subsystem used for storing, retrieving and manipulating data stored in a database. In addition, the data includes records, data pages, data containers, data objects and the like. The database is an organized collection of data. In an example, the application includes MySQL, MS-Access, Oracle Database, BangDB, NoSQL and the like. In another example, the application is at least one of data editing application, finance application, network management application or any other application of the like.

Also, the application provides a user interface to the administrator 102 to interact with hardware elements of the computing device. In an embodiment of the present disclosure, the user interface includes Graphical User Interface (GUI). In another embodiment of the present disclosure, the user interface includes Application Programming Interface (API). However, the user interface is not limited to above mentioned user interface. The user interface helps to send and receive commands and data. In addition, the user interface serves to display or return results of operation from the application. In an embodiment of the present disclosure, the user interface is part of the application.

In an embodiment of the present disclosure, the scalable query implementation system is installed at a server. In another embodiment of the present disclosure, the application is installed at the server. In an embodiment of the present disclosure, the scalable query implementation system is installed at a plurality of servers. In another embodiment of the present disclosure, the application is installed at the plurality of servers.

In an embodiment of the present disclosure, the scalable query implementation system 108 is associated with the server. The server is a computer program or device that provides functionality to other programs or devices. The server provides various functionalities, such as sharing data or resources among multiple clients, or performing computation for the one or more clients or the administrator 102. The server includes a database. The database stores different sets of information associated with various components of the scalable query implementation system 108. The database is used to store general information and specialized data. The database organizes data using models such as relational models or hierarchical models. In addition, the database stores data provided by the administrator 102. In an example, the plurality of servers may include database server, file server, application server and the like. The plurality of servers communicates with each other using the communication network 106.

The interactive computing environment 100 includes the communication network 106. The scalable queue implementation system 104 uses the communication network 106 to connect to the one or more communication devices 108. The communication network 106 provides medium to the scalable queue implementation system 104 to connect to the one or more communication devices 108. In addition, the communication network 106 provides network connectivity to the one or more communication devices 108. Further, the communication network 106 provides network connectivity to the computing device. In an example, the communication network 106 provides protocol to connect the scalable queue implementation system 104 with the one or more communication devices 108. The communication network 106 connects the scalable queue implementation system 104 with the one or more communication devices 108 using a plurality of methods. The plurality of methods used to provide network connectivity includes 2G, 3G, 4G, 5G, Wifi and the like.

The communication network 106 is part of network layer responsible for connection of two or more servers. Further, the communication network 106 may be any type of network. In an embodiment of the present disclosure, the type of communication network 106 is wireless mobile network. In another embodiment of the present disclosure, the type of communication network 106 is wired network with a finite bandwidth. In yet another embodiment of the present disclosure, the type of communication network 106 is combination of wireless and wired network for optimum throughput of data transmission. In yet another embodiment of the present disclosure, the type of communication network 106 is an optical fiber high bandwidth network that enables a high data rate with negligible connection drops.

In an example, the communication network 106 includes but may not be limited to local area network, metropolitan area network, wide area network, and virtual private network. In an embodiment of the present disclosure, the communication device 104 is connected with the scalable queue implementation system 104 using Local Area Network (LAN). In another embodiment of the present disclosure, the communication device 104 is connected with the scalable queue implementation system 104 using Metropolitan Area Network (MAN). In yet another embodiment of the present disclosure, the communication device 104 is connected with the scalable queue implementation system 104 using Wide Area Network (WAN).

The interactive computing environment 100 includes the scalable queue implementation system 104. The scalable queue implementation system 104 performs the method for implementation of the scalable queue with the delay factor.

The scalable queue implementation system 104 creates a disk based queue. The disk based queue performs writing of data from a secondary storage in to a primary storage. The secondary storage refers to any non-volatile storage that is internal or external to the computing device. The secondary storage is used for permanent data storage. In an embodiment of the present disclosure, the secondary storage may be an auxiliary storage or external storage. In an example, the secondary storage includes hard disk drives, solid state drives, SD cards, tape drives and the like.

Hard disk drive is an electro-mechanical data storage device that uses magnetic storage to store and retrieve digital data. Hard disk drive is made up of a plurality of rapidly rotating platters coated with magnetic material. The plurality of rapidly rotating platters stores data. Solid state drive is a solid state storage device that uses integrated circuit assemblies to store data persistently.

SD cards stands for secure digital card. SD card is a proprietary non-volatile memory card format developed for use in portable devices. Tape drive is a data storage device that reads and writes data on a magnetic tape. Magnetic tape is used for offline, non-volatile data storage.

The primary storage refers to storage used to store information for immediate use in the computing device. The primary storage is a volatile or non-volatile storage that holds storage for short period of time while the computing device is running. In an example, the primary storage includes but may not be limited to random access memory (RAM), read only memory (ROM), programmable read only memory (PROM), and flash memory.

Random access memory is a form of computer memory that may be read and changed in any order. In addition, random access memory is used to store working data and machine code. Read only memory is a type of memory in which data cannot be electronically modified after data is written. Programmable read only memory is a type of digital read only memory where setting of each bit is locked by a fuse or anti-fuse. Data stored in programmable read only memory is permanent and cannot be changed. Flash memory is a type of computer memory that can be elastically erased and reprogrammed.

The disk based queue performs writing of data from the secondary storage in to the primary storage for faster computations. In an embodiment of the present disclosure, the scalable queue implementation system 104 performs memory mapping. Memory mapping is a technique that maps portion of file, or an entire file, on secondary storage to a range of addresses within address space of application.

The scalable queue implementation system 104 maps head of the disk based queue and tail of the disk based queue with the primary storage. Head is front of the disk based queue. Tail is rear of the disk based queue. The mapping of the head of the disk based queue and the tail of the disk based queue facilitates the disk based queue to perform faster computations. The scalable queue implementation system 104 does not map records or entities in between the head and the tail of the disk based queue.

Head represents position where data is entered in to the disk based queue. Tail represents position from where data is removed from the disk based queue. The scalable queue implementation system 104 performs enqueue operation. Enqueue operation represents addition of data inside the disk based queue. Enqueue operation facilitates loading data in to the disk based queue from the primary memory. The scalable queue implementation system 104 performs dequeue operation. Dequeue operation represents removal of data from the disk based queue. Dequeue operation facilitates loading data from the primary memory to the disk based queue.

The scalable queue implementation system 104 performs addition of checksum in between data inside the disk based queue. The scalable queue implementation system 104 adds the checksum to identify tampering in data. The scalable queue implementation system 104 adds the checksum to maintain persistence and throughput in the disk based queue. In an embodiment of the present disclosure, throughput is based on speed of the primary storage. Throughput is rate of production or rate at which something is processed. In an embodiment of the present disclosure, the scalable queue implementation system 104 provides persistence by saving data in the secondary storage. Persistence refers to characteristics of state that outlives the process that created it.

Checksum is a value used to verify integrity of file or data transfer. Checksum is used to detect errors that may have been introduced during transmission or storage of data. The tampering in data in the disk based queue is performed due to one or more factors. The one or more factors include but may not be limited to power failure and hardware failure. In an embodiment of the present disclosure, checksum is used to identify tampering in case of half-written files. In an embodiment of the present disclosure, checksum is used to provide reliability to the disk based queue.

The scalable queue implementation system 104 divides the disk based queue in to a plurality of sub-queues with the delay factor. The delay factor is achieved by dividing the disk based queue in to the plurality of sub-queues based on a time period. The disk based queue is highly scalable using a network file system. Network file system is a client/server application that allows user on a client computer to store and access files over a computer network. In an embodiment of the present disclosure, the delay factor is used to provide granularity to the disk based queue.

The disk based queue is divided in to the plurality of sub-queues based on the time period. The time period is either pre-determined or the time period is set by the administrator 102 based on requirement. In an embodiment of the present disclosure, the administrator 102 manually defines the time period. In another embodiment of the present disclosure, the time period is pre-defined.

The scalable queue implementation system 104 sends alerts based on data stored in the disk based queue. The scalable queue implementation system 104 sends out the alerts based on implementation of each of the plurality of sub-queues according to the delay factor. In an embodiment of the present disclosure, each of the plurality of sub-queues is a first-in-first-out queue.

In an embodiment of the present disclosure, the scalable queue implementation system 104 sends notifications based on data stored in the disk based queue. In another embodiment of the present disclosure, the scalable queue implementation system 104 sends reminders based on data stored in the disk based queue. In an embodiment of the present disclosure, the scalable queue implementation system 104 performs enqueue operation faster than dequeue operation. In another embodiment of the present disclosure, the scalable queue implementation system 104 performs dequeue operation faster than enqueue operation. In yet another embodiment of the present disclosure, the scalable queue implementation system 104 performs enqueue operation and dequeue operation at equal speed.

In an example, the administrator 102 wants to send the one or more notifications to the one or more clients. The administrator 102 wants to send the one or more notifications based on different time. The administrator 102 utilizes the scalable queue implementation system 104 to create the disk based queue. The disk based queue includes the one or more notifications that are to be sent to the one or more clients.

The scalable queue implementation system 104 maps the head of the disk based queue and the tail of the disk based queue with random access memory. The scalable queue implementation system 104 performs addition of checksum in between data inside the disk based queue. The scalable queue implementation system 104 divides the disk based queue in to the plurality of sub-queues with the delay factor.

The delay factor is time period in which the administrator 102 wants to send out the one or more notifications to the one or more clients. In one case, the plurality of sub-queues is created based on 30 minutes, 15 minutes, 5 minutes and so on. The scalable queue implementation system 104 sends out the one or more notifications based on implementation of the plurality of sub-queues.

Figure 2:
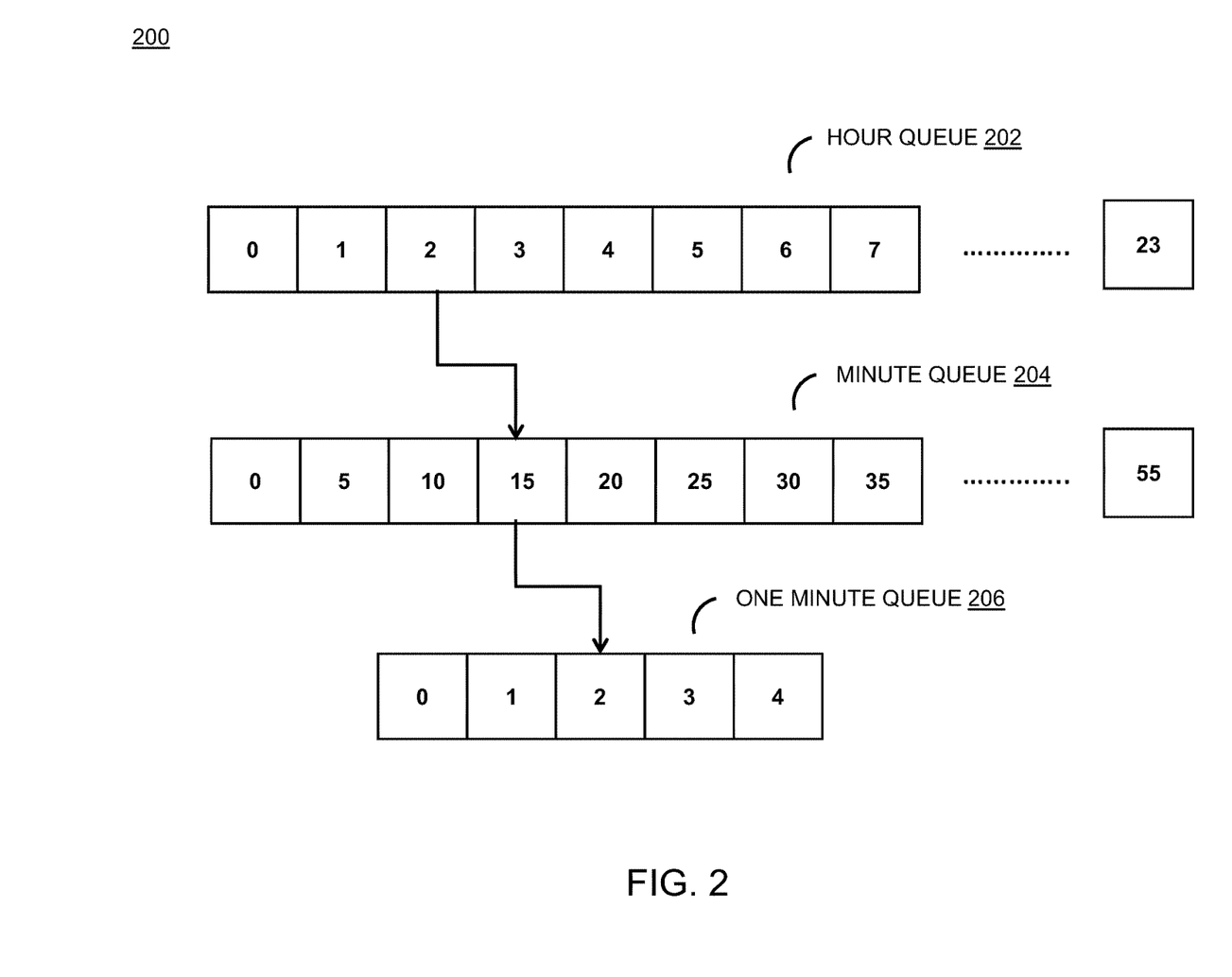
FIG. 2 illustrates an exemplary overview of implementation of the scalable queue with the delay factor, in accordance with various embodiments of the present disclosure.

FIG. 2 illustrates an exemplary overview 200 of implementation of the scalable queue with the delay factor, in accordance with various embodiments of the present disclosure.

The exemplary overview 200 includes an hour queue 202. The hour queue 202 includes 24 entities ranging from 0 to 23. Each of 24 entities represent one hour time frame. In addition, the exemplary overview 200 includes a minute queue 204. The minute queue 204 includes 12 entities as 0, 5, 10, 15, 20, 25, 30, 35, 40, 45, 50, and 55. Each of 12 entities represent a 5 minute time frame. Further, the exemplary overview 200 includes one minute queue 206. The one minute queue 206 includes 5 entities as 0, 1, 2, 3, and 4. Each of 5 entities represent one minute time frame.

In an example, the minute queue 204 is a subset of the hour queue 202. The scalable queue implementation system 104 copies data from the hour queue 202 to the minute queue 204 based on the delay factor. In addition, the one minute queue 206 is a subset of the minute queue 204. The scalable queue implementation system 104 copies data from the minute queue 204 to the one minute queue 206 based on the delay factor. The scalable queue implementation system 104 always performs dequeue operation from the one minute queue 206. Let us suppose the administrator 102 wants to send out 3 notifications at different time. The administrator 102 wants to send first notification at 03:08 am, second notification at 02:11 am, and third notification at 05:10 am. The scalable queue implementation system 104 performs enqueue operation as per order of ingestion of time period by the administrator 102.

The scalable queue implementation system 104 moves first notification to entity 3 of the hour queue 202. In addition, the scalable queue implementation system 104 moves second notification to entity 2 of the hour queue 202. Further, the scalable queue implementation system 104 moves third notification to entity 5 of the hour queue 202. At beginning of each hour, the scalable queue implementation system 104 moves notifications from the hour queue 202 to the respective minute queue 204. At 2:00 am, the scalable queue implementation system 104 moves second notification from entity 2 of the hour queue 202 to entity 10 of the minute queue 204. At 3:00 am, the scalable queue implementation system 104 moves first notification from entity 3 of the hour queue 202 to entity 05 of the minute queue 204. At 5:00 am, the scalable queue implementation system 104 moves third notification from entity 5 of the hour queue 202 to entity 10 of the minute queue 204.

Further, at 2:10 am, the scalable queue implementation system 104 moves second notification from entity 10 of the minute queue 204 to entity 1 of the one minute queue 206. Moreover, at 3:05 am, the scalable queue implementation system 104 moves first notification from entity 05 of the minute queue 204 to entity 3 of the one minute queue 206. Also, at 5:10 am, the scalable queue implementation system 104 moves third notification from entity 10 of the minute queue 204 to entity 0 of the one minute queue 206. The scalable queue implementation system 104 performs dequeue operation at the one minute queue 206.

Figure 3:
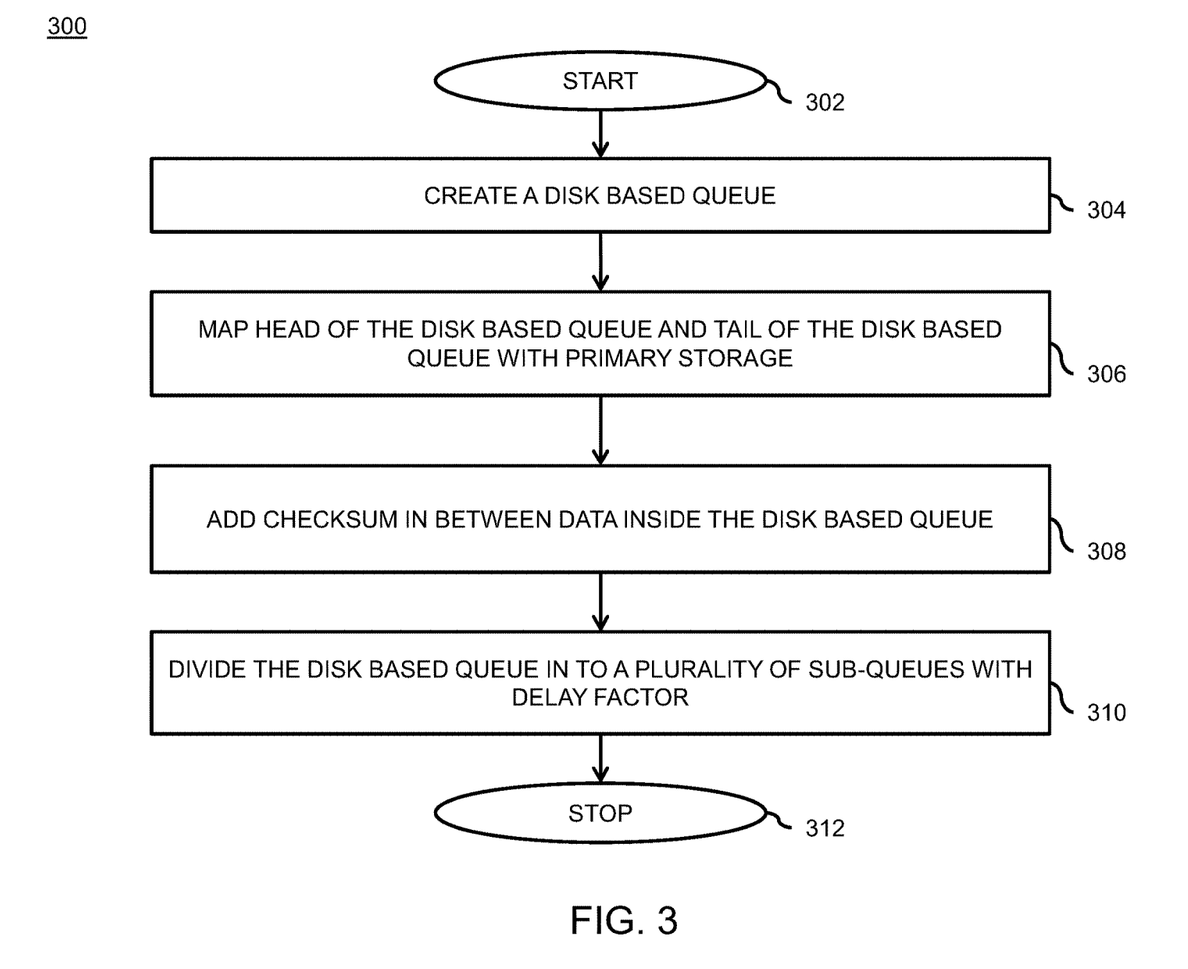
FIG. 3 illustrates a flow chart of a method for implementation of the scalable queue with the delay factor, in accordance with various embodiments of the present disclosure.

FIG. 3 illustrates a flow chart 300 of a method for implementation of the scalable queue with the delay factor, in accordance with various embodiments of the present disclosure. It may be noted that to explain the process steps of flowchart 300, references will be made to the system elements of FIG. 1.

The flowchart 300 initiates at step 302. Following step 302, at step 304, the scalable queue implementation system 104 creates the disk based queue. In addition, at step 306, the scalable queue implementation system 104 maps the head of the disk based queue and the tail of the disk based queue with the primary storage. Further, at step 308, the scalable queue implementation system 104 adds checksum in between data inside the disk based queue. Furthermore, at step 310, the scalable queue implementation system 104 divides the disk based queue in to the plurality of sub-queues with the delay factor. The flowchart 300 terminates at step 312.

Figure 4:
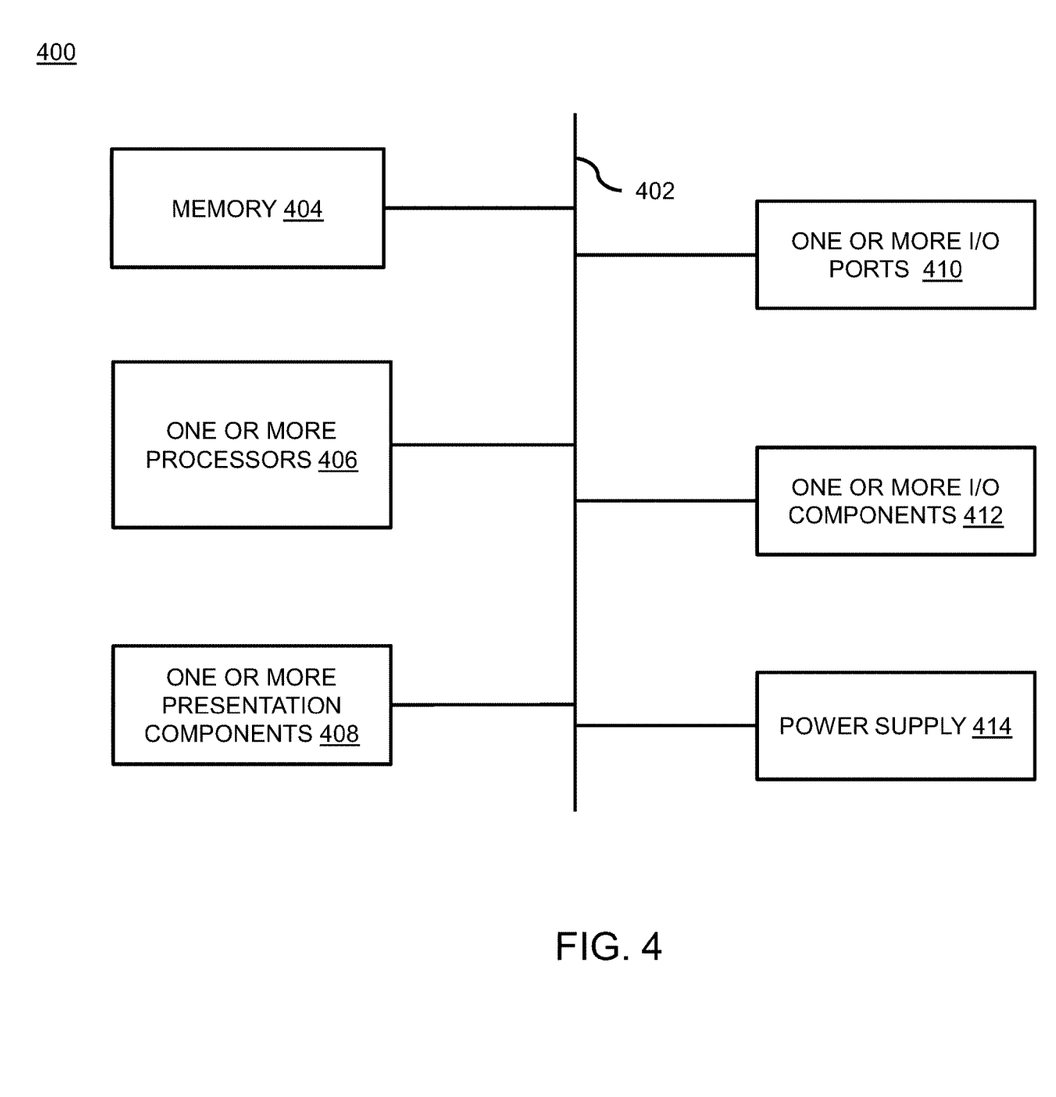
FIG. 4 illustrates a block diagram of a computing device, in accordance with various embodiments of the present disclosure.

FIG. 4 illustrates the block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for implementation of a scalable queue with a delay factor, the computer-implemented method comprising:
   creating, at a scalable queue implementation system with a processor, a disk based queue, wherein the disk based queue performs writing of data from a secondary storage into a primary storage;
   mapping, at the scalable queue implementation system with the processor, head of the disk based queue and tail of the disk based queue with the primary storage;
   adding checksum, at the scalable queue implementation system with the processor, in between data inside the disk based queue, wherein the checksum is added for identifying tampering in data, wherein the checksum is added for maintaining persistence and throughput in the disk based queue; and
   dividing, at the scalable queue implementation system with the processor, the disk based queue into a plurality of sub-queues based on a time period, wherein the plurality of sub-queues comprises the delay factor, wherein the delay factor is achieved by dividing the disk based queue based on the time period, and wherein the disk based queue is scalable using a network file system.

2. The computer-implemented method as recited in claim 1, further comprising sending, at the scalable queue implementation system with the processor, alerts based on data stored in the disk based queue, wherein the alerts are sent out based on implementation of each of the plurality of sub-queues according to the delay factor.

3. The computer-implemented method as recited in claim 1, further comprising performing, at the scalable queue implementation system with the processor, enqueue operation, wherein the enqueue operation facilitates loading data into the disk based queue from the primary storage.

4. The computer-implemented method as recited in claim 1, further comprising performing, at the scalable queue implementation system with the processor, dequeue operation, wherein the dequeue operation facilitates removing data from the disk based queue.

5. The computer-implemented method as recited in claim 1, wherein
   tampering in data in the disk based queue is performed due to one or more factors, wherein the one or more factors comprising power failure and hardware failure.

6. The computer-implemented method as recited in claim 1, wherein the disk based queue is divided into the plurality of sub-queues based on the time period, wherein the time period is either pre-determined or the time period is set by an administrator based on requirement.

7. The computer-implemented method as recited in claim 1, wherein each of the plurality of sub-queues is a first-in-first-out queue.

8. A computer system comprising:
   one or more processors; and
   a memory coupled to the one or more processors, the memory for storing instructions which, when executed by the one or more processors, cause the one or more processors to perform a method for implementation of a scalable queue with a delay factor, the method comprising:
   creating, at a scalable queue implementation system, a disk based queue, wherein the disk based queue performs writing from a secondary storage into a primary storage;
   mapping, at the scalable queue implementation system, head of the disk based queue and tail of the disk based queue with the primary storage;
   adding checksum, at the scalable queue implementation system, in between data inside the disk based queue, wherein the checksum is added for identifying tampering in data, wherein the checksum is added for maintaining persistence and throughput in the disk based queue; and
   dividing, at the scalable queue implementation system, the disk based queue into a plurality of sub-queues based on a time period, wherein the plurality of sub-queues comprises the delay factor, wherein the delay factor is achieved by dividing the disk based queue based on the time period, and wherein the disk based queue is scalable using a network file system.

9. The computer system as recited in claim 8, further comprising sending, at the scalable queue implementation system, alerts based on data stored in the disk based queue, wherein the alerts are sent out based on implementation of each of the plurality of sub-queues according to the delay factor.

10. The computer system as recited in claim 8, further comprising performing, at the scalable queue implementation system, enqueue operation, wherein the enqueue operation facilitates loading data into the disk based queue from the primary storage.

11. The computer system as recited in claim 8, further comprising performing, at the scalable queue implementation system, dequeue operation, wherein the dequeue operation facilitates removing data from the disk based queue.

12. The computer system as recited in claim 8, wherein tampering in data in the disk based queue is performed due to one or more factors, wherein the one or more factors comprising power failure and hardware failure.

13. The computer system as recited in claim 8, wherein the disk based queue is divided into the plurality of sub-queues based on the time period, wherein the time period is either pre-determined or the time period is set by an administrator based on requirement.

14. The computer system as recited in claim 8, wherein each of the plurality of sub-queues is a first-in-first-out queue.

15. A non-transitory computer-readable storage medium encoding computer executable instructions that, when executed by at least one processor, performs a method for implementation of a scalable queue with a delay factor, the method comprising:
   creating, at a computing device, a disk based queue, wherein the disk based queue performs writing from a secondary storage into a primary storage;

mapping, at the computing device, head of the disk based queue and tail of the disk based queue with the primary storage;

adding checksum, at the computing device, in between data inside the disk based queue, wherein the checksum is added for identifying tampering in data, wherein the checksum is added for maintaining persistence and throughput in the disk based queue; and dividing, at the computing device, the disk based queue into a plurality of sub-queues based on a time period, wherein the plurality of sub-queues comprises the delay factor, wherein the delay factor is achieved by dividing the disk based queue based on the time period, and wherein the disk based queue is scalable using a network file system.

16. The non-transitory computer-readable storage medium as recited in claim 15, further comprising sending, at the computing device, alerts based on data stored in the disk based queue, wherein the alerts are sent out based on implementation of each of the plurality of sub-queues according to the delay factor.

17. The non-transitory computer-readable storage medium as recited in claim 15, further comprising performing, at the computing device, enqueue operation, wherein the enqueue operation facilitates loading data into the disk based queue from the primary storage.

18. The non-transitory computer-readable storage medium as recited in claim 15, further comprising performing, at the computing device, dequeue operation, wherein the dequeue operation facilitates removing data from the the disk based queue.

19. The non-transitory computer-readable storage medium as recited in claim 15, wherein tampering in data in the disk based queue is performed due to one or more factors, wherein the one or more factors comprising power failure and hardware failure.

20. The non-transitory computer-readable storage medium as recited in claim 15, wherein the disk based queue is divided into the plurality of sub-queues based on the time period, wherein the time period is either pre-determined or the time period is set by an administrator based on requirement.

* * * * *